US012300151B2

(12) United States Patent
Zeng et al.

(10) Patent No.: US 12,300,151 B2
(45) Date of Patent: May 13, 2025

(54) PIXEL CIRCUIT AND DISPLAY DEVICE WITH THREE RESET UNITS

(71) Applicant: WUHAN CHINA STAR OPTOELECTRONICS SEMICONDUCTOR DISPLAY TECHNOLOGY CO., LTD., Wuhan (CN)

(72) Inventors: Mian Zeng, Wuhan (CN); Liang Sun, Wuhan (CN)

( * ) Notice: Subject to any disclaimer, the term of this patent is extended or adjusted under 35 U.S.C. 154(b) by 0 days.

(21) Appl. No.: 17/622,831

(22) PCT Filed: Dec. 22, 2021

(86) PCT No.: PCT/CN2021/140585
§ 371 (c)(1),
(2) Date: Dec. 26, 2021

(87) PCT Pub. No.: WO2023/087486
PCT Pub. Date: May 25, 2023

(65) Prior Publication Data
US 2024/0038141 A1 Feb. 1, 2024

(30) Foreign Application Priority Data
Nov. 16, 2021 (CN) ......................... 202111356204.5

(51) Int. Cl.
*G09G 3/32* (2016.01)

(52) U.S. Cl.
CPC ....... *G09G 3/32* (2013.01); *G09G 2300/0426* (2013.01); *G09G 2300/0852* (2013.01); *G09G 2300/0861* (2013.01); *G09G 2310/0267* (2013.01); *G09G 2310/062* (2013.01);
(Continued)

(58) Field of Classification Search
CPC ............. G09G 3/32; G09G 2300/0426; G09G 2300/0852; G09G 2300/0861; G09G 2310/0267; G09G 2310/062; G09G 2320/0247; G09G 2330/021
See application file for complete search history.

(56) References Cited

U.S. PATENT DOCUMENTS

2009/0243977 A1* 10/2009 Chung ................ G09G 3/3233 345/76
2010/0207920 A1* 8/2010 Chaji .................. G09G 3/3233 345/76
2016/0005384 A1 1/2016 Yoon et al.
(Continued)

FOREIGN PATENT DOCUMENTS

CN 1989539 A 6/2007
CN 106952615 A 7/2017
(Continued)

*Primary Examiner* — Benjamin C Lee
*Assistant Examiner* — Nathan P Brittingham

(57) ABSTRACT

The present application provides a pixel circuit and a display device; the pixel circuit includes a driving unit, a light emitting control unit electrically connected to the driving unit, and a first reset unit electrically connected to the driving unit, and a first end of the first reset unit is electrically connected to the driving unit, a second end of the first reset unit is electrically connected to the first constant voltage signal input end, and a control end of the first reset unit is electrically connected to the first reset signal input end.

16 Claims, 3 Drawing Sheets

(52) U.S. Cl.
CPC ............... *G09G 2320/0247* (2013.01); *G09G 2330/021* (2013.01)

(56) References Cited

U.S. PATENT DOCUMENTS

| | | | | |
|---|---|---|---|---|
| 2019/0385528 | A1* | 12/2019 | Hou | G09G 3/3696 |
| 2020/0051500 | A1 | 2/2020 | Lin et al. | |
| 2020/0273411 | A1* | 8/2020 | Gao | G09G 3/3233 |
| 2023/0066613 | A1* | 3/2023 | Liu | G09G 3/3233 |

FOREIGN PATENT DOCUMENTS

| | | | |
|---|---|---|---|
| CN | 107767813 | A | 3/2018 |
| CN | 109308864 | A | 2/2019 |
| CN | 109599062 | A | 4/2019 |
| CN | 111477179 | A | 7/2020 |
| CN | 111627387 | A | 9/2020 |
| CN | 112086070 | A | 12/2020 |
| CN | 113628585 | A | 11/2021 |

* cited by examiner

PIXEL CIRCUIT AND DISPLAY DEVICE WITH THREE RESET UNITS

CROSS-REFERENCE TO RELATED APPLICATION

This application claims the priority of Chinese Patent Application No. 202111356204.5, filed on Nov. 16, 2021, in the China National Intellectual Property Administration, entitled "PIXEL CIRCUIT AND DISPLAY DEVICE", the entire content of which is incorporated herein by reference.

FIELD OF INVENTION

The present application relates to a display technology field, in particular to a pixel circuit and a display device.

BACKGROUND OF INVENTION

Low-frequency driving display is an important direction of display technology development. Most of the transistors used in conventional 7T1C (consisting of seven transistors and one storage capacitor) pixel circuits are low-temperature polysilicon transistors. One obvious disadvantage of such transistors is that the leakage current is large, and the display effect is severely affected under a condition of low-frequency display. A current solution is to replace the transistor connected to the driving transistor with a metal oxide transistor, which can alleviate the leakage current between the transistor and the driving transistor to a certain extent. However, when the display is driven at a low frequency, the screen dwell time is longer, and the driving transistor is subjected to a long-time electric stress to cause a threshold voltage shift, which causes the current flowing through the driving transistor to change, which further leads to a change in the luminance of the display panel to cause a flicker problem.

SUMMARY OF INVENTION

Technical Problem

There is a technical problem in the current pixel circuit that the current flowing through the driving transistor changes during low-frequency display.

Technical Solution

The present application provides a pixel circuit and a display device for alleviating a technical problem existing in the current pixel circuit that the current flowing through a driving transistor changes during a low-frequency display.

The present application provides a pixel circuit comprising:

- a driving unit electrically connected between a first power supply input end and a light emitting unit;
- a light emitting control unit electrically connected between the first power supply input end and the light emitting unit and electrically connected to the driving unit; and
- a first reset unit, wherein a first end of the first reset unit is electrically connected to the driving unit, a second end of the first reset unit is electrically connected to a first constant voltage signal input end, and a control end of the first reset unit is electrically connected to a first reset signal input end.

In the pixel circuit of the present application, the pixel circuit further comprises a second reset unit, a first end of the second reset unit is electrically connected to the light emitting unit, a second end of the second reset unit is electrically connected to a second constant voltage signal input end, and a control end of the second reset unit is electrically connected to a second reset signal input end.

In the pixel circuit of the present application, the pixel circuit further comprises a third reset unit, a first end of the third reset unit is electrically connected to the light emitting unit, a second end of the third reset unit is electrically connected to the second constant voltage signal input end, and a control end of the third reset unit is electrically connected to a first scan signal input end.

In the pixel circuit of the present application, the light emitting control unit comprises a first light emitting control unit and a second light emitting control unit, the first light emitting control unit is electrically connected between the first power supply input end and the driving unit, and the second light emitting control unit is electrically connected between the driving unit and the light emitting unit.

In the pixel circuit of the present application, the first end of the first reset unit is electrically connected between the first light emitting control unit and the driving unit.

In the pixel circuit of the present application, the first end of the first reset unit is electrically connected between the driving unit and the second light emitting control unit.

In the pixel circuit of the present application, both the first end of the second reset unit and the first end of the third reset unit are electrically connected between the second light emitting control unit and the light emitting unit.

In the pixel circuit of the present application, the pixel circuit further comprises an input unit, a first end of the input unit is electrically connected between the first light emitting control unit and the driving unit, a second end of the input unit is electrically connected to a data signal input end, and a control end of the input unit is electrically connected to the first scan signal input end.

In the pixel circuit of the present application, the pixel circuit further comprises a compensation unit, a first end of the compensation unit is electrically connected to a control end of the driving unit, a second end of the compensation unit is electrically connected between the driving unit and the second light emitting control unit, and a control end of the compensation unit is electrically connected to a second scan signal input end.

In the pixel circuit of the present application, the pixel circuit further comprises an initializing unit, a first end of the initializing unit is electrically connected to the control end of the driving unit, a second end of the initializing unit is electrically connected to a third constant voltage signal input end, and a control end of the initializing unit is electrically connected to the second scan signal input end.

In the pixel circuit of the present application, the driving unit comprises a first transistor, the first light emitting control unit comprises a second transistor, and the second light emitting control unit comprises a third transistor.

In the pixel circuit of the present application, a gate, a source, and a drain of the second transistor are electrically connected to a first control signal input end, the first power supply input end, and a source of the first transistor, respectively, and a gate, a source, and a drain of the third transistor are electrically connected to a second control signal input end, a drain of the first transistor, and the light emitting unit, respectively.

In the pixel circuit of the present application, the first reset unit comprises a fourth transistor.

In the pixel circuit of the present application, a gate, a source, and a drain of the fourth transistor are electrically connected to the first reset signal input end, the first constant voltage signal input end, and a source or a drain of the first transistor, respectively.

In the pixel circuit of the present application, the second reset unit comprises a fifth transistor.

In the pixel circuit of the present application, a gate, a source, and a drain of the fifth transistor are electrically connected to the second reset signal input end, the second constant voltage signal input end, and the light emitting unit, respectively.

In the pixel circuit of the present application, the third reset unit comprises a sixth transistor.

In the pixel circuit of the present application, a gate, a source, and a drain of the sixth transistor are electrically connected to the first scan signal input end, the second constant voltage signal input end, and the light emitting unit, respectively.

In the pixel circuit of the present application, the compensation unit comprises a seventh transistor, the input unit comprises an eighth transistor, and the initializing unit comprises a ninth transistor;

- a gate, a source, and a drain of the seventh transistor are electrically connected to the second scan signal input end, a gate of the first transistor, and a drain of the first transistor, respectively, a gate, a source, and a drain of the eighth transistor are electrically connected to the first scan signal input end, the data signal input end, and a source of the first transistor, respectively, and a gate, a source, and a drain of the ninth transistor are electrically connected to the second scan signal input end, the third constant voltage signal input end, and the gate of the first transistor, respectively.

The present application further provides a display device comprising a pixel circuit, the pixel circuit comprises:

- a driving unit electrically connected between a first power supply input end and a light emitting unit;
- a light emitting control unit electrically connected between the first power supply input end and the light emitting unit and electrically connected to the driving unit; and
- a first reset unit, wherein a first end of the first reset unit is electrically connected to the driving unit, a second end of the first reset unit is electrically connected to a first constant voltage signal input end, and a control end of the first reset unit is electrically connected to a first reset signal input end.

Advantageous Effects

A pixel circuit and a display device are provide by the present application, the pixel circuit includes a driving unit, a light emitting control unit electrically connected to the driving unit, and a first reset unit electrically connected to the driving unit, a first end of the first reset unit is electrically connected to the driving unit, a second end of the first reset unit is electrically connected to a first constant voltage signal input end, and a control end of the first reset unit is electrically connected to a first reset signal input end. In the present application, a first reset unit electrically connected to the driving unit is provided, and the voltage of the driving unit is adjusted by the first reset unit, thereby relieving the unidirectional electric stress applied to the driving unit during low-frequency display, stabilizing the current flowing through the driving unit, and further improving the display effect of the display device during low-frequency display.

DESCRIPTION OF DRAWINGS

In order to more clearly explain the technical solutions in the embodiments or prior art, the following will briefly introduce the drawings required in the description of the embodiments or prior art. Obviously, the drawings in the following description are only some embodiments of the present disclosure. For those of ordinary skill in the art, without paying any creative work, other drawings can be obtained based on these drawings.

DETAILED DESCRIPTION OF EMBODIMENTS

Figure 1:
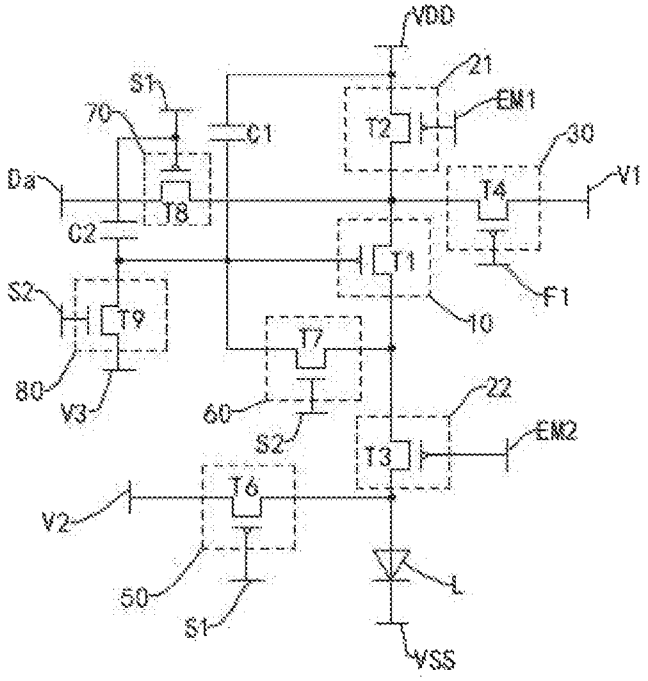
FIG. 1 is a schematic structural diagram of a first pixel circuit according to an embodiment of the present application.

The description of the following embodiments refers to the attached drawings to illustrate specific embodiments in which the present disclosure can be implemented. The directional terms mentioned in the present disclosure, such as [up], [down], [front], [back], [left], [right], [inner], [outer], [side], etc., are only the direction of the attached drawings. Therefore, the directional terms used are used to describe and understand the present disclosure, rather than to limit the present disclosure. In the drawings, units with similar structures are indicated by the same reference numerals.

Embodiments of the present application provide a pixel circuit and a display device, the pixel circuit includes a driving unit, a light emitting control unit electrically connected to the driving unit, and a first reset unit electrically connected to the driving unit, a first end of the first reset unit is electrically connected to the driving unit, a second end of the first reset unit is electrically connected to a first constant voltage signal input end, and a control end of the first reset unit is electrically connected to a first reset signal input end. In the present application, a first reset unit electrically connected to the driving unit is provided, and the voltage of the driving unit is adjusted by the first reset unit, thereby relieving the unidirectional electric stress applied to the driving unit during low-frequency display, stabilizing the current flowing through the driving unit, and further improving the display effect of the display device during low-frequency display.

The structure and function of a pixel circuit provided by an embodiment of the present application will be described below with reference to the accompanying drawings.

In an embodiment, referring to FIG. 1, FIG. 1 is a schematic structural diagram of a first pixel circuit according to an embodiment of the present application. The pixel circuit includes a driving unit 10, a light emitting control unit, and a first reset unit 30, wherein the light emitting control unit may include a first light emitting control unit 21 and a second light emitting control unit 22. The driving unit 10 is electrically connected between a first power supply input end VDD and the light emitting unit L; the light emitting control unit is electrically connected between the first power supply input end VDD and the light emitting unit L, and electrically connected to the driving unit 10; the first reset unit 30 is electrically connected to the driving unit 10 for adjusting the current flowing through the driving unit 10.

Specifically, the first light emitting control unit 21 is electrically connected between the first power supply input end VDD and the driving unit 10, and a control end of the first light emitting control unit 21 is electrically connected to a first control signal input end EM1; the second light emitting control unit 22 is electrically connected between the driving unit 10 and the light emitting unit L, and a control end of the second light emitting control unit 22 is electrically connected to a second control signal input end EM2; another end of the light emitting unit L is electrically connected to a second power supply input end VSS. A first end of the first reset unit 30 is electrically connected between the first light emitting control unit 21 and the driving unit 10, a second end of the first reset unit 30 is electrically connected to a first constant voltage signal input end V1, and a control end of the first reset unit is electrically connected to a first reset signal input end F1.

It may be understood that the first power supply input end VDD and the second power supply input end VSS provide voltage signals, respectively, and that the voltage provided by the first power supply input end VDD is greater than the voltage provided by the second power supply input end VSS; the first constant voltage signal input end V1 is configured to provide a specific constant voltage which can be set according to the demand of the driving unit 10; the first reset signal input end F1 is configured to provide a specific square wave signal, so as to control the first reset unit to periodically input a constant voltage inputted by the first constant voltage signal input end V1 to the driving unit 10, thereby alleviating a change in current of the driving unit 10 caused by a unidirectional electrical stress. In addition, with respect to the low-frequency display driving, the embodiment of the present application can control the resetting of the operating state of the driving unit 10 through the signal inputted from the first reset signal input end F1 under the premise of ensuring that the scan signal maintains the low-frequency scanning, so that the current flowing through the driving unit 10 is prevented from changing, and therefore the frequency of part of the scan signal does not need to be increased under the low-frequency driving. Therefore, the embodiment of the present application is further conducive to reducing the overall energy consumption of the pixel circuit.

Alternatively, the first control signal input end EM1 and the second control signal input end EM2 may input the same control signal or may input different control signals as necessary.

Further, the pixel circuit further includes a third reset unit 50, a compensation unit 60, an input unit 70, and an initializing unit 80. The third reset unit is configured to reset a voltage of an input end of the light emitting unit L; the compensation unit 60 is configured to compensate a voltage of a control end of the driving unit 10; the input unit 70 is configured to input a data signal and drive the light emitting unit L to emit light through the driving unit 10; the initializing unit 80 is configured to perform an initialization operation on a voltage of a control end of the driving unit 10.

A first end of the third reset unit 50 is electrically connected to the light emitting unit, a second end of the third reset unit 50 is electrically connected to a second constant voltage signal input end V2, and a control end of the third reset unit is electrically connected to a first scan signal input end S1. Wherein the first end and the second end of the third reset unit 50 respectively refer to an output end and an input end of the third reset unit 50; the second constant voltage signal input end V2 is configured to provide a specific voltage that can be set according to the demand of the light emitting unit L; the first scan signal input end S1 is configured to provide a periodic scan signal to control the third reset unit 50 to input the light emitting unit L with a specific voltage periodically input by the second constant voltage signal input end V2, thereby completing a reset operation of the light emitting unit L.

A first end of the compensation unit 60 is electrically connected to the control end of the driving unit 10, a second end of the compensation unit 60 is electrically connected between the driving unit 10 and the second light emitting control unit 22, and a control end of the compensation unit 60 is electrically connected to a second scan signal input end S2. Wherein the first and second ends of the compensation unit 60 refer to the output and input ends of the compensation unit 60, respectively; the second scan signal input end S2 is configured to provide a periodic scan signal to control the compensation unit 60 to select whether the control end of the driving unit 10 is electrically connected between the driving unit 10 and the second light emitting control unit 22.

A first end of the input unit 70 is electrically connected between the first light emitting control unit 21 and the driving unit 10, a second end of the input unit 70 is electrically connected to a data signal input end Da, and a control end of the input unit 70 is electrically connected to the first scan signal input end S1. Wherein the first and second ends of the input unit 70 refer to the output and input ends of the input unit 70, respectively; the data signal input end Da is configured to input a data signal; the scan signal inputted from the first scan signal input end S1 controls the input unit 70 to transmit the data signal to the driving unit 10, and the light emitting unit L is driven to emit light through the driving unit 10.

A first end of the initializing unit 80 is electrically connected to the control end of the driving unit 10, a second end of the initializing unit 80 is electrically connected to a third constant voltage signal input end V3, and a control end of the initializing unit 80 is electrically connected to the second scan signal input end S2. Wherein a first end and a second end of the initializing unit 80 refer to an output end and an input end of the initializing unit 80, respectively; the third constant voltage signal input end V3 is configured to provide an initial voltage; the scan signal inputted from the second scan signal input end S2 controls the initializing unit 80 to transmit the initial voltage supplied from the third constant voltage signal input end V3 to the control end of the driving unit 10, so as to implement an initialization operation on the control end of the driving unit 10.

Further, the driving unit 10 includes a first transistor T1, the first light emitting control unit 21 includes a second transistor T2, the second light emitting control unit 22 includes a third transistor T3, the first reset unit 30 includes a fourth transistor T4, the third reset unit 50 includes a sixth transistor T6, the compensation unit 60 includes a seventh transistor T7, the input unit 70 includes an eighth transistor T8, and the initializing unit 80 includes a ninth transistor T9.

Wherein a gate, a source and a drain of the second transistor T2 are electrically connected to the first control signal input end EM1, the first power supply input end VDD and a source of the first transistor T1, respectively, a gate, a source and a drain of the third transistor T3 are electrically connected to the second control signal input end EM2, a drain of the first transistor T1 and the light emitting unit L, respectively, a gate, a source and a drain of the fourth transistor T4 are electrically connected to the first reset signal input end F1, the first constant voltage signal input end V1 and the source or the drain of the first transistor T1, respectively, a gate, a source and a drain of the sixth transistor T6 are electrically connected to the first scan signal input end S1, the second constant voltage signal input end V2 and the light emitting unit L, respectively, a gate, a source and a drain of the seventh transistor T7 are electrically connected to the second scan signal input end S2, the gate of the first transistor T1 and the drain of the first transistor T1, respectively, a gate, a source and a drain of the eighth transistor T8 are electrically connected to the first scan signal input end S1, the data signal input end Da and the source of the first transistor T1, respectively, and a gate, a source and a drain of the ninth transistor T9 are electrically connected to the second scan signal input end S2, the third constant voltage signal input end V3 and the gate of the first transistor T1, respectively.

The pixel circuit further includes a first capacitor C1 and a second capacitor C2, opposite ends of the first capacitor C1 are electrically connected to the first power supply input end VDD and the gate of the first transistor T1, respectively, and opposite ends of the second capacitor C2 are electrically connected to the first scan signal input end S1 and the gate of the first transistor T1, respectively.

Figure 2:
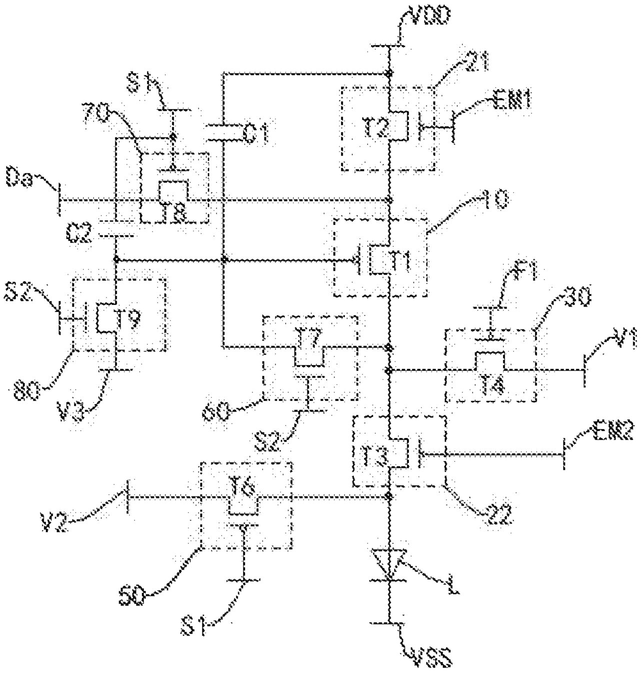
FIG. 2 is a schematic structural diagram of a second pixel circuit according to an embodiment of the present application.

In another embodiment, referring to FIG. 2, FIG. 2 is a schematic structural diagram of a second pixel circuit according to an embodiment of the present application. It may be understood that the pixel circuit provided in this embodiment has the same or similar structural features as the pixel circuit described in the above embodiment. The pixel circuit in this embodiment will be described below. For details not described herein, please refer to the description of the above embodiment.

The pixel circuit includes a driving unit 10, a light emitting control unit, a first reset unit 30, a third reset unit 50, a compensation unit 60, an input unit and an initializing unit 80. The light emitting control unit may include a first light emitting control unit 21 and a second light emitting control unit 22. The first reset unit is electrically connected between the driving unit 10 and the second light emitting control unit 22 for adjusting the current flowing through the driving unit 10.

The first light emitting control unit 21 is electrically connected between a first power supply input end VDD and the driving unit 10, and a control end of the first light emitting control unit 21 is electrically connected to the first control signal input end EM1; the second light emitting control unit 22 is electrically connected between the driving unit 10 and the light emitting unit L, and a control end of the second light emitting control unit 22 is electrically connected to a second control signal input end EM2; another end of the light emitting unit L is electrically connected to a second power supply input end VSS. A first end of the first reset unit is electrically connected between the driving unit 10 and the second light emitting control unit 22, a second end of the first reset unit 30 is electrically connected to a first constant voltage signal input end V1, and a control end of the first reset unit 30 is electrically connected to a first reset signal input end F1.

A first end of the third reset unit 50 is electrically connected to the light emitting unit L, a second end of the third reset unit 50 is electrically connected to a second constant voltage signal input end V2, and a control end of the third reset unit is electrically connected to a first scan signal input end S1. A first end of the compensation unit 60 is electrically connected to the control end of the driving unit a second end of the compensation unit 60 is electrically connected between the driving unit 10 and the second light emitting control unit 22, and a control end of the compensation unit 60 is electrically connected to a second scan signal input end S2. A first end of the input unit 70 is electrically connected between the first light emitting control unit 21 and the driving unit 10, a second end of the input unit 70 is electrically connected to a data signal input end Da, and a control end of the input unit 70 is electrically connected to the first scan signal input end S1. A first end of the initializing unit 80 is electrically connected to the control end of the driving unit 10, a second end of the initializing unit 80 is electrically connected to a third constant voltage signal input end V3, and a control end of the initializing unit 80 is electrically connected to the second scan signal input end S2.

Further, the driving unit 10 includes a first transistor T1, the first light emitting control unit 21 includes a second transistor T2, the second light emitting control unit 22 includes a third transistor T3, the first reset unit 30 includes a fourth transistor T4, the third reset unit 50 includes a sixth transistor T6, the compensation unit 60 includes a seventh transistor T7, the input unit 70 includes an eighth transistor T8, and the initializing unit 80 includes a ninth transistor T9.

Wherein a gate, a source and a drain of the second transistor T2 are electrically connected to the first control signal input end EM1, the first power supply input end VDD and a source of the first transistor T1, respectively, a gate, a source and a drain of the third transistor T3 are electrically connected to the second control signal input end EM2, a drain of the first transistor T1 and the light emitting unit L, respectively, a gate, a source and a drain of the fourth transistor T4 are electrically connected to the first reset signal input end F1, the first constant voltage signal input end V1 and the source or the drain of the first transistor T1, respectively, a gate, a source and a drain of the sixth transistor T6 are electrically connected to the first scan signal input end S1, the second constant voltage signal input end V2 and the light emitting unit L, respectively, a gate, a source and a drain of the seventh transistor T7 are electrically connected to the second scan signal input end S2, the gate of the first transistor T1 and the drain of the first transistor T1, respectively, a gate, a source and a drain of the eighth transistor T8 are electrically connected to the first scan signal input end S1, the data signal input end Da and the source of the first transistor T1, respectively, and a gate, a source and a drain of the ninth transistor T9 are electrically connected to the second scan signal input end S2, the third constant voltage signal input end V3 and the gate of the first transistor T1, respectively.

The pixel circuit further includes a first capacitor C1 and a second capacitor C2, opposite ends of the first capacitor C1 are electrically connected to the first power supply input end VDD and the gate of the first transistor T1, respectively, and opposite ends of the second capacitor C2 are electrically connected to the first scan signal input end S1 and the gate of the first transistor T1, respectively.

Figure 3:
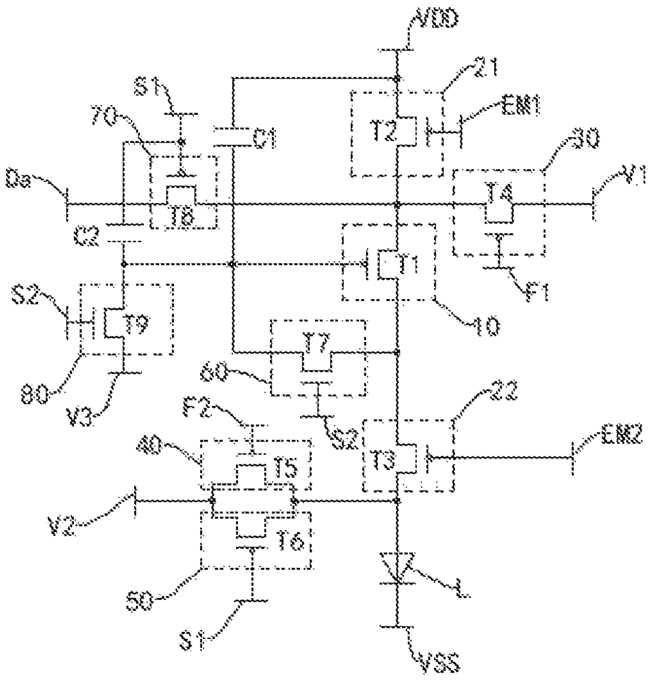
FIG. 3 is a schematic structural diagram of a third pixel circuit according to an embodiment of the present application.

In another embodiment, referring to FIG. 3, FIG. 3 is a schematic structural diagram of a third pixel circuit according to an embodiment of the present application. It will be understood that the pixel circuit provided in this embodiment has the same or similar structural features as the pixel circuit described in the above embodiment. The pixel circuit in this embodiment will be described below. For details not described herein, please refer to the description of the above embodiment.

The pixel circuit includes a driving unit 10, a light emitting control unit, a first reset unit 30, a second reset unit 40, a third reset unit 50, a compensation unit 60, an input unit 70, and an initializing unit 80. The light emitting control unit may include a first light emitting control unit 21 and a second light emitting control unit 22. The first reset unit 30 is electrically connected between the first light emitting control unit 21 and the driving unit 10 for adjusting a current flowing through the driving unit 10; the second reset unit 40 is electrically connected between the second light emitting control unit 22 and the light emitting unit L to reset the light emitting unit L.

The first light emitting control unit 21 is electrically connected between a first power supply input end VDD and the driving unit 10, and a control end of the first light emitting control unit 21 is electrically connected to the first control signal input end EM1; the second light emitting control unit 22 is electrically connected between the driving unit 10 and the light emitting unit L, and a control end of the second light emitting control unit 22 is electrically connected to a second control signal input end EM2; another end of the light emitting unit L is electrically connected to a second power supply input end VSS. A first end of the first reset unit 30 is electrically connected between the first light emitting control unit 21 and the driving unit 10, a second end of the first reset unit 30 is electrically connected to a first constant voltage signal input end V1, and a control end of the first reset unit 30 is electrically connected to a first reset signal input end F1.

A first end of the second reset unit 40 is electrically connected to the light emitting unit L, a second end of the second reset unit 40 is electrically connected to a second constant voltage signal input end V2, and a control end of the second reset unit 40 is electrically connected to a second reset signal input end F2. The second reset signal input end F2 is configured to provide a specific square wave signal to control the second reset unit 40 to periodically transmit the constant voltage inputted by the second constant voltage signal input end V2 to the light emitting unit L, thereby realizing a reset operation on the light emitting unit L.

Alternatively, the signal inputted from the second reset signal input end F2 and the signal inputted from the first reset signal input end F1 may be the same signal to implement simultaneous operation of the first reset unit 30 and the second reset unit 40. It may be understood that for the same frame screen driven by the low frequency display, the current flowing through the driving unit 10 is stabilized under the action of the first reset unit 30, and the current flowing to the light emitting unit L is stabilized under the action of the second reset unit 40, so that the light emitting unit L is ensured to emit light stably, and the flicker problem is prevented.

A first end of the third reset unit 50 is electrically connected to the light emitting unit L, a second end of the third reset unit 50 is electrically connected to a second constant voltage signal input end V2, and a control end of the third reset unit is electrically connected to a first scan signal input end S1. A first end of the compensation unit 60 is electrically connected to the control end of the driving unit a second end of the compensation unit 60 is electrically connected between the driving unit 10 and the second light emitting control unit 22, and a control end of the compensation unit 60 is electrically connected to a second scan signal input end S2. A first end of the input unit 70 is electrically connected between the first light emitting control unit 21 and the driving unit 10, a second end of the input unit 70 is electrically connected to a data signal input end Da, and a control end of the input unit 70 is electrically connected to the first scan signal input end S1. A first end of the initializing unit 80 is electrically connected to the control end of the driving unit 10, a second end of the initializing unit 80 is electrically connected to a third constant voltage signal input end V3, and a control end of the initializing unit 80 is electrically connected to the second scan signal input end S2.

Further, the driving unit 10 includes a first transistor T1, the first light emitting control unit 21 includes a second transistor T2, the second light emitting control unit 22 includes a third transistor T3, the first reset unit 30 includes a fourth transistor T4, the third reset unit 50 includes a sixth transistor T6, the compensation unit 60 includes a seventh transistor T7, the input unit 70 includes an eighth transistor T8, and the initializing unit 80 includes a ninth transistor T9.

Wherein a gate, a source and a drain of the second transistor T2 are electrically connected to the first control signal input end EVIL the first power supply input end VDD and a source of the first transistor T1, respectively, a gate, a source and a drain of the third transistor T3 are electrically connected to the second control signal input end EM2, a drain of the first transistor T1 and the light emitting unit L, respectively, a gate, a source and a drain of the fourth transistor T4 are electrically connected to the first reset signal input end F1, the first constant voltage signal input end V1 and the source or the drain of the first transistor T1, respectively, a gate, a source and a drain of the sixth transistor T6 are electrically connected to the first scan signal input end S1, the second constant voltage signal input end V2 and the light emitting unit L, respectively, a gate, a source and a drain of the seventh transistor T7 are electrically connected to the second scan signal input end S2, the gate of the first transistor T1 and the drain of the first transistor T1, respectively, a gate, a source and a drain of the eighth transistor T8 are electrically connected to the first scan signal input end S1, the data signal input end Da and the source of the first transistor T1, respectively, and a gate, a source and a drain of the ninth transistor T9 are electrically connected to the second scan signal input end S2, the third constant voltage signal input end V3 and the gate of the first transistor T1, respectively.

The pixel circuit further includes a first capacitor C1 and a second capacitor C2, opposite ends of the first capacitor C1 are electrically connected to the first power supply input end VDD and the gate of the first transistor T1, respectively, and opposite ends of the second capacitor C2 are electrically connected to the first scan signal input end S1 and the gate of the first transistor T1, respectively.

Figure 4:
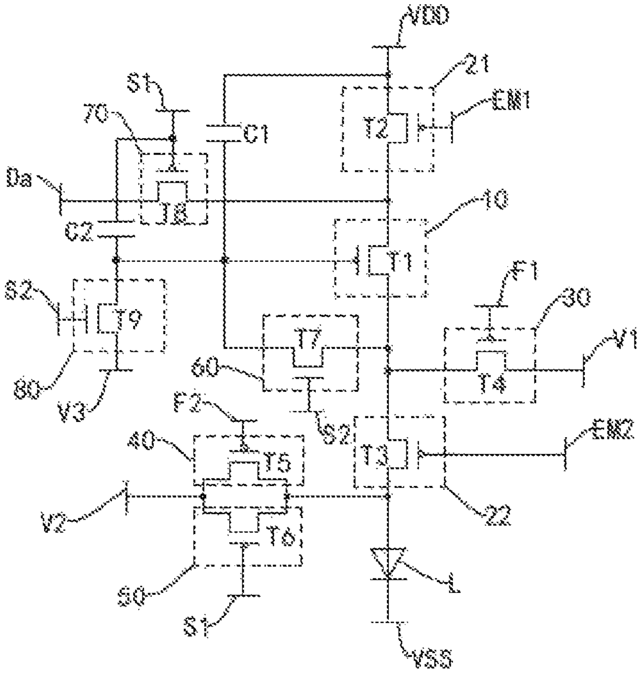
FIG. 4 is a schematic structural diagram of a fourth pixel circuit according to an embodiment of the present application.

In another embodiment, referring to FIG. 4, FIG. 4 is a schematic structural diagram of a fourth pixel circuit according to an embodiment of the present application. It may be understood that the pixel circuit provided in this embodiment has the same or similar structural features as the pixel circuit described in the above embodiment. The pixel circuit in this embodiment will be described below. For details not described herein, please refer to the description of the above embodiment.

The pixel circuit includes a driving unit 10, a light emitting control unit, a first reset unit 30, a second reset unit 40, a third reset unit 50, a compensation unit 60, an input unit 70, and an initializing unit 80. The light emitting control unit may include a first light emitting control unit 21 and a second light emitting control unit 22. The first reset unit 30 is electrically connected between the driving unit 10 and the second light emitting control unit 22 for adjusting a current flowing through the driving unit 10; the second reset unit 40 is electrically connected between the second light emitting control unit 22 and the light emitting unit L to reset the light emitting unit L.

The first light emitting control unit 21 is electrically connected between a first power supply input end VDD and the driving unit 10, and a control end of the first light emitting control unit 21 is electrically connected to the first control signal input end EM1; the second light emitting control unit 22 is electrically connected between the driving unit 10 and the light emitting unit L, and a control end of the second light emitting control unit 22 is electrically connected to a second control signal input end EM2; another end of the light emitting unit L is electrically connected to a second power supply input end VS S.

A first end of the first reset unit 30 is electrically connected between the driving unit 10 and the second light emitting control unit 22, a second end of the first reset unit 30 is electrically connected to a first constant voltage signal input end V1, and a control end of the first reset unit 30 is electrically connected to a first reset signal input end F1. A first end of the second reset unit 40 is electrically connected to the light emitting unit L, a second end of the second reset unit 40 is electrically connected to a second constant voltage signal input end V2, and a control end of the second reset unit 40 is electrically connected to a second reset signal input end F2.

A first end of the third reset unit 50 is electrically connected to the light emitting unit L, a second end of the third reset unit 50 is electrically connected to a second constant voltage signal input end V2, and a control end of the third reset unit is electrically connected to a first scan signal input end S1. A first end of the compensation unit 60 is electrically connected to the control end of the driving unit a second end of the compensation unit 60 is electrically connected between the driving unit 10 and the second light emitting control unit 22, and a control end of the compensation unit 60 is electrically connected to a second scan signal input end S2. A first end of the input unit 70 is electrically connected between the first light emitting control unit 21 and the driving unit 10, a second end of the input unit 70 is electrically connected to a data signal input end Da, and a control end of the input unit 70 is electrically connected to the first scan signal input end S1. A first end of the initializing unit 80 is electrically connected to the control end of the driving unit 10, a second end of the initializing unit 80 is electrically connected to a third constant voltage signal input end V3, and a control end of the initializing unit 80 is electrically connected to the second scan signal input end S2.

Further, the driving unit 10 includes a first transistor T1, the first light emitting control unit 21 includes a second transistor T2, the second light emitting control unit 22 includes a third transistor T3, the first reset unit 30 includes a fourth transistor T4, the third reset unit 50 includes a sixth transistor T6, the compensation unit 60 includes a seventh transistor T7, the input unit 70 includes an eighth transistor T8, and the initializing unit 80 includes a ninth transistor T9.

Wherein a gate, a source and a drain of the second transistor T2 are electrically connected to the first control signal input end EM1, the first power supply input end VDD and a source of the first transistor T1, respectively, a gate, a source and a drain of the third transistor T3 are electrically connected to the second control signal input end EM2, a drain of the first transistor T1 and the light emitting unit L, respectively, a gate, a source and a drain of the fourth transistor T4 are electrically connected to the first reset signal input end F1, the first constant voltage signal input end V1 and the source or the drain of the first transistor T1, respectively, a gate, a source and a drain of the sixth transistor T6 are electrically connected to the first scan signal input end S1, the second constant voltage signal input end V2 and the light emitting unit L, respectively, a gate, a source and a drain of the seventh transistor T7 are electrically connected to the second scan signal input end S2, the gate of the first transistor T1 and the drain of the first transistor T1, respectively, a gate, a source and a drain of the eighth transistor T8 are electrically connected to the first scan signal input end S1, the data signal input end Da and the source of the first transistor T1, respectively, and a gate, a source and a drain of the ninth transistor T9 are electrically connected to the second scan signal input end S2, the third constant voltage signal input end V3 and the gate of the first transistor T1, respectively.

The pixel circuit further includes a first capacitor C1 and a second capacitor C2, opposite ends of the first capacitor C1 are electrically connected to the first power supply input end VDD and the gate of the first transistor T1, respectively, and opposite ends of the second capacitor C2 are electrically connected to the first scan signal input end S1 and the gate of the first transistor T1, respectively.

Figure 5:
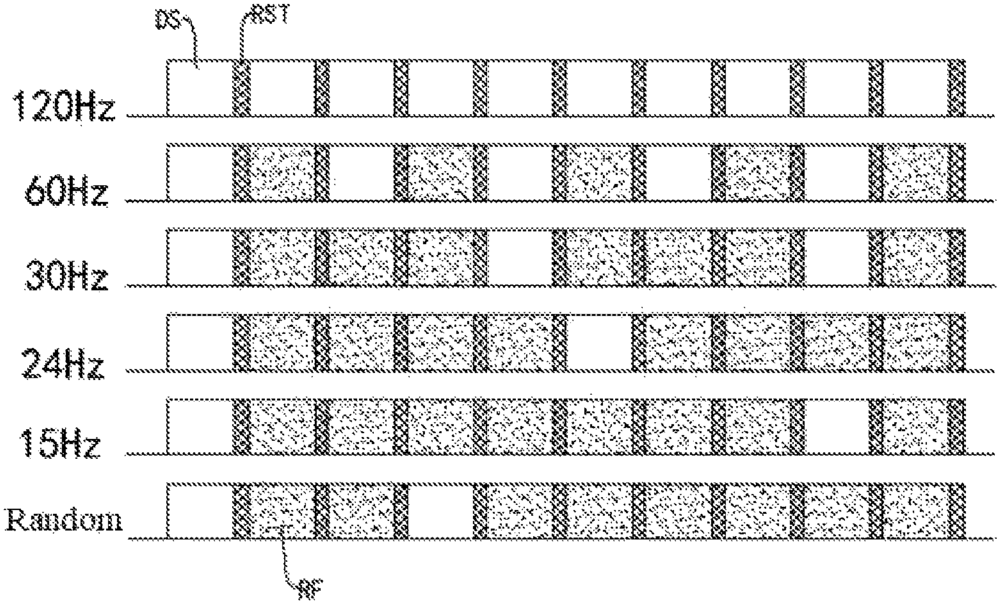
FIG. 5 is a schematic diagram of a driving mode for driving a display device to display at different frequencies using a pixel circuit according to an embodiment of the present application.

The operation of the pixel circuit shown in FIG. 1 will now be described with reference to FIGS. 5 and 6. FIG. 5 is a schematic diagram of a driving mode for driving a display device to display at different frequencies using a pixel circuit according to an embodiment of the present application, and FIG. 6 is a driving timing diagram of a pixel circuit according to an embodiment of the present application.

With respect to FIG. 5, at a higher driving frequency, for example, 120 Hz, stages in which the pixel circuit drives the display device includes only a display stage DS and a reset stage RST, wherein the reset stage RST is a stage in which the third reset unit 50 and the initializing unit 80 are operated to reset the display screen. At this higher driving frequency, the time interval between the two adjacent display stages DS is shorter, during this period, there is no phenomenon that the current flowing through the driving unit 10 changes greatly, and a stable display effect can be maintained. Therefore, the first reset unit 30 may not operate at a higher driving frequency.

As the driving frequency decreases, for example, 60 Hz, 30 Hz, 24 Hz, 15 Hz, and a random frequency less than 120 Hz, stages in which the pixel circuit drives the display device includes also includes a reset duration stage RF, in this case, the time interval between the two adjacent display stages DS increases, during this period, the current flowing through the driving unit 10 has a tendency to change, so that the reset duration stage RF is added; during the reset duration stage RF, the first reset unit 30 is operated to adjust the electrical stress applied to the driving unit 10, so as to stabilize the current flowing through the driving unit 10, thereby preventing flicker.

Figure 6:
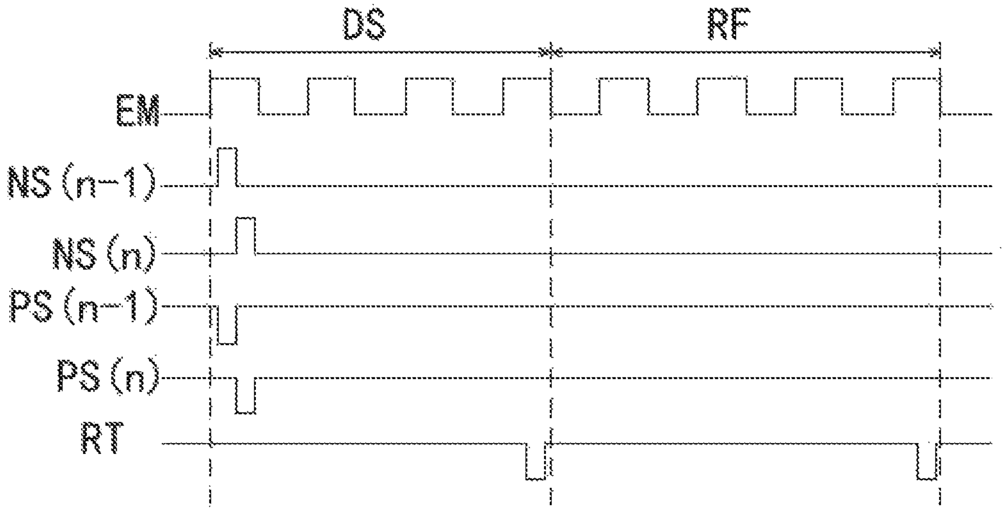
FIG. 6 is a driving timing diagram of a pixel circuit according to an embodiment of the present application.

As shown in FIG. 6, NS(n−1) and NS(n) refer to an (n−1)-th stage second scan signal and an n-th stage second scan signal, respectively, PS(n−1) and PS(n) refer to an (n−1)-th stage first scan signal and an n-th stage first scan signal, the second scan signal input end S2 connected to the compensation unit 60 receives the NS(n), and the second scan signal input end S2 connected to the initializing unit 80 receives the NS(n−1), the first scan signal input end S1 connected to the third reset unit 50 and the first scan signal input end S1 connected to the input unit 70 receive PS(n). The first reset signal input end F1 receive a reset signal RT. Both the first control signal input end EM1 and the second control signal input end EM2 receive a control signal EM.

In the display stage DS, the pixel circuit drives the display device to perform display under the action of the signals NS(n−1), NS(n), PS(n−1), PS(n) and EM, and in a short time before the arrival of the reset duration stage RF, the reset signal RT turns on the first reset unit 30 to perform a reset operation on the driving unit 10. During the reset duration stage RF, several scan signals, such as NS(n−1), NS(n), PS(n−1), and PS(n), are maintained at a constant voltage, and during this period, the reset signal RT may turn on the first reset unit 30 again or multiple times as necessary to reset the driving unit 10 again or multiple times, so as to maintain the stability of the current flowing through the driving unit 10.

An embodiment of the present application further provides a display device including the pixel circuit of any one of the above embodiments. The display device may be an organic light emitting diode display device, a micro light emitting diode display device, or a display, a notebook computer, a tablet computer, a television set, a mobile phone, or the like, which include the display device.

It should be noted that, although the present application discloses the foregoing embodiments, the foregoing embodiments are not intended to limit the present application. A person of ordinary skill in the art may make various changes and finishes without departing from the spirit and scope of the present application. Therefore, the protection scope of the present application is subject to the scope defined by the claims.

What is claimed is:

1. A pixel circuit comprising:

a driving unit electrically connected between a first power supply input end and a light emitting unit;

a light emitting control unit electrically connected between the first power supply input end and the light emitting unit and electrically connected to the driving unit, wherein the light emitting control unit comprises a first light emitting control unit and a second light emitting control unit, the first light emitting control unit is electrically connected between the first power supply input end and the driving unit, and the second light emitting control unit is electrically connected between the driving unit and the light emitting unit;

a first reset unit, wherein a first end of the first reset unit is electrically connected to the driving unit, a second end of the first reset unit is electrically connected to a first constant voltage signal input end, and a control end of the first reset unit is electrically connected to a first reset signal input end; and an input unit, a first end of the input unit is electrically connected between the first light emitting control unit and the driving unit, a second end of the input unit is electrically connected to a data signal input end, and a control end of the input unit is electrically connected to a first scan signal input end;

wherein the first end of the first reset unit is electrically connected between the driving unit and one of the first light emitting control unit and the second light emitting control unit, and the first reset unit and the input unit are turned on at different times;

wherein the pixel circuit further comprises a second reset unit, a first end of the second reset unit is electrically connected to the light emitting unit, a second end of the second reset unit is electrically connected to a second constant voltage signal input end, and a control end of the second reset unit is electrically connected to a second reset signal input end;

wherein the pixel circuit further comprises a third reset unit, a first end of the third reset unit is electrically connected to the light emitting unit, a second end of the third reset unit is electrically connected to the second constant voltage signal input end, and a control end of the third reset unit is electrically connected to the first scan signal input end;

wherein the second reset unit and the third reset unit are connected in parallel.

2. The pixel circuit according to claim 1, wherein the first end of the first reset unit is electrically connected between the first light emitting control unit and the driving unit.

3. The pixel circuit according to claim 1, wherein the first end of the first reset unit is electrically connected between the driving unit and the second light emitting control unit.

4. The pixel circuit according to claim 1, wherein both the first end of the second reset unit and the first end of the third reset unit are electrically connected between the second light emitting control unit and the light emitting unit.

5. The pixel circuit according to claim 1, wherein the pixel circuit further comprises a compensation unit, a first end of the compensation unit is electrically connected to a control end of the driving unit, a second end of the compensation unit is electrically connected between the driving unit and the second light emitting control unit, and a control end of the compensation unit is electrically connected to a second scan signal input end.

6. The pixel circuit according to claim 5, wherein the pixel circuit further comprises an initializing unit, a first end of the initializing unit is electrically connected to the control end of the driving unit, a second end of the initializing unit is electrically connected to a third constant voltage signal input end, and a control end of the initializing unit is electrically connected to the second scan signal input end.

7. The pixel circuit according to claim 6, wherein the driving unit comprises a first transistor, the first light emitting control unit comprises a second transistor, and the second light emitting control unit comprises a third transistor.

8. The pixel circuit according to claim 7, wherein a gate, a source, and a drain of the second transistor are electrically connected to a first control signal input end, the first power supply input end, and a source of the first transistor, respectively, and a gate, a source, and a drain of the third transistor are electrically connected to a second control signal input end, a drain of the first transistor, and the light emitting unit, respectively.

9. The pixel circuit according to claim 7, wherein the first reset unit comprises a fourth transistor.

10. The pixel circuit according to claim 9, wherein a gate, a source, and a drain of the fourth transistor are electrically connected to the first reset signal input end, the first constant voltage signal input end, and a source or a drain of the first transistor, respectively.

11. The pixel circuit according to claim 9, wherein the second reset unit comprises a fifth transistor.

12. The pixel circuit according to claim 11, wherein a gate, a source, and a drain of the fifth transistor are electrically connected to the second reset signal input end, the second constant voltage signal input end, and the light emitting unit, respectively.

13. The pixel circuit according to claim 11, wherein the third reset unit comprises a sixth transistor.

14. The pixel circuit according to claim 13, wherein a gate, a source, and a drain of the sixth transistor are electrically connected to the first scan signal input end, the second constant voltage signal input end, and the light emitting unit, respectively.

15. The pixel circuit according to claim 13, wherein the compensation unit comprises a seventh transistor, the input unit comprises an eighth transistor, and the initializing unit comprises a ninth transistor;

a gate, a source, and a drain of the seventh transistor are electrically connected to the second scan signal input end, a gate of the first transistor, and a drain of the first transistor, respectively, a gate, a source, and a drain of the eighth transistor are electrically connected to the first scan signal input end, the data signal input end, and a source of the first transistor, respectively, and a gate, a source, and a drain of the ninth transistor are electrically connected to the second scan signal input end, the third constant voltage signal input end, and the gate of the first transistor, respectively.

16. A display device comprising a pixel circuit, wherein the pixel circuit comprises:

a driving unit electrically connected between a first power supply input end and a light emitting unit;

a light emitting control unit electrically connected between the first power supply input end and the light emitting unit and electrically connected to the driving unit, wherein the light emitting control unit comprises a first light emitting control unit and a second light emitting control unit, the first light emitting control unit is electrically connected between the first power supply input end and the driving unit, and the second light emitting control unit is electrically connected between the driving unit and the light emitting unit;

a first reset unit, wherein a first end of the first reset unit is electrically connected to the driving unit, a second end of the first reset unit is electrically connected to a first constant voltage signal input end, and a control end of the first reset unit is electrically connected to a first reset signal input end; and an input unit, a first end of the input unit is electrically connected between the first light emitting control unit and the driving unit, a second end of the input unit is electrically connected to a data signal input end, and a control end of the input unit is electrically connected to a first scan signal input end;

wherein the first end of the first reset unit is electrically connected between the driving unit and one of the first light emitting control unit and the second light emitting control unit, and the first reset unit and the input unit are turned on at different times;

wherein the pixel circuit further comprises a second reset unit, a first end of the second reset unit is electrically connected to the light emitting unit, a second end of the second reset unit is electrically connected to a second constant voltage signal input end, and a control end of the second reset unit is electrically connected to a second reset signal input end;

wherein the pixel circuit further comprises a third reset unit, a first end of the third reset unit is electrically connected to the light emitting unit, a second end of the third reset unit is electrically connected to the second constant voltage signal input end, and a control end of the third reset unit is electrically connected to the first scan signal input end;

wherein the second reset unit and the third reset unit are connected in parallel.

* * * * *